US010614404B2

(12) United States Patent
Guo et al.

(10) Patent No.: US 10,614,404 B2
(45) Date of Patent: Apr. 7, 2020

(54) PRODUCTIVITY INSIGHT DASHBOARD

(71) Applicant: Microsoft Technology Licensing, LLC, Redmond, WA (US)

(72) Inventors: Wendy Guo, Edmonds, WA (US); Andrew James Wald, Bothell, WA (US); Noelle Renee Beaujon, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 563 days.

(21) Appl. No.: 15/377,215

(22) Filed: Dec. 13, 2016

(65) Prior Publication Data

US 2018/0165621 A1 Jun. 14, 2018

(51) Int. Cl.
*G06Q 10/06* (2012.01)

(52) U.S. Cl.
CPC ........... *G06Q 10/06398* (2013.01); *G06Q 10/063114* (2013.01)

(58) Field of Classification Search
CPC ............... G06Q 10/06; G06Q 10/00–99/00
See application file for complete search history.

(56) References Cited

U.S. PATENT DOCUMENTS

| | | | |
|---|---|---|---|
| 7,912,899 B2 * | 3/2011 | Beauchamp | G06Q 10/107 709/204 |
| 8,219,429 B2 | 7/2012 | Blair et al. | |
| 8,301,475 B2 | 10/2012 | Bean et al. | |
| 8,904,547 B2 | 12/2014 | Doddy et al. | |
| 2004/0003042 A1 * | 1/2004 | Horvitz | G06Q 10/109 709/204 |
| 2008/0120129 A1 * | 5/2008 | Seubert | G06Q 10/06 705/35 |

(Continued)

FOREIGN PATENT DOCUMENTS

EP 2856395 A1 * 4/2015

OTHER PUBLICATIONS

Velcu-Laitinen, Oana & Yigitbasioglu, Ogan. (2012). The Use of Dashboards in Performance Management: Evidence from Sales Managers. International Journal of Digital Accounting Research. 12. 39-58. 10.4192/1577-8517-v12_2. (Year: 2012).*

(Continued)

*Primary Examiner* — Alan S Miller
*Assistant Examiner* — Jay-Ming Wang
(74) *Attorney, Agent, or Firm* — Merchant & Gould

(57) ABSTRACT

Systems and methods for providing productivity insights regarding user networks are provided. Productivity insights are determinable based on event data, such as email messaging events and/or calendaring events, and enable a user to see at a glance how and with whom the user has spent his or her time. Additionally, productivity insights highlight any changes that occur over time within a user network. Analytics based on event data allow a user to easily identify top collaborators, which may or may not be the most important collaborators, as well as specific metrics for each collaborator, such as response time, email read rate, total collaboration time, etc. Thus, productivity insights serve to qualify and quantify collaborative relationships for individual employees so that they can leverage their time more effectively by improving collaboration within their networks, thereby increasing workplace productivity.

20 Claims, 12 Drawing Sheets

(56) References Cited

U.S. PATENT DOCUMENTS

2009/0012760 A1 1/2009 Schunemann
2013/0124631 A1 5/2013 Rosansky et al.

OTHER PUBLICATIONS

Cross, et al., "Mapping the value of employee collaboration", http://www.mckinsey.com/business-functions/organization/our-insights/mapping-the-value-of-employee-collaboration, Published on: Aug. 2006, 9 pages.

Ou, et al., "Can instant messaging empower teams at work?", In Proceedings of Fourth International Conference on Research Challenges in Information Science, May 19, 2010, 10 pages.

Banford, et al., "Relationship Mapping for Proactive Growth of Knowledge Networks", In Proceedings of IEEE 70th Vehicular Technology Conference Fall, Sep. 23, 2009, 5 pages.

Rozewski, et al., "Knowledge workers' collaborative learning behavior modeling in an organizational social network", In Journal of Computers in Human Behavior, vol. 51, Oct. 2015, pp. 1-35.

Rouse, et al., "Employee Monitoring", http://whatis.techtarget.com/definition/employee-monitoring, Published on: Sep. 2014, 3 pages.

\* cited by examiner

| Office 365 | Delve | | 🔍 | ⚙ | ? | Joe 512 |

Search mail and people

🏠 Home
👤 Me
ⓘ MyAnalytics 506
⭐ Favorites

People
Chris Basore
Amit Agar
Alex Kamen
Tim Dettmer
Xuedong Huang
Calvin Chan
Mark Radner

MyAnalytics

< 11/13/2016 – 11/19/2016 >  Time Settings

Your time
Your stats are based on your email and calendar  Learn More

Meeting Hours | Email Hours ✉ | Focus Hours 💡 | After Hours 🕐
--- | --- | --- | ---
2.3 hrs   Goal < 10 hrs | 4.3 hrs   Goal < 10 hrs | 41.3 hrs   Goal > 10 hrs | 1.1 hrs   Goal < 5 hrs
Edit goal | Edit goal | Edit goal | Edit goal Stay in touch 514
Important  Top Collaborators 510

| Chris Basore | | Amit Agar | | Calvin Chan | | Mark Radner | |
|---|---|---|---|---|---|---|---|
| Total time | 1 hrs | Total time | 1 hrs | Total time | 1.6 hrs | Total time | 3.8 hrs |
| Read percent | 22.2% | Read percent | - | Read percent | 41.2% | Read percent | 92.3% |
| Response time | - | Response time | - | Response time | - | Response time | 2.3 hrs |

View details ( Network )  508

You and your manager 516

You collaborated with Mark Radner   3.8 ▲0.4 hrs

1:1 meetings  🟦 0.5 hrs

Email read rate  ✉ 92.3%

Your response time  🕐 2.3 hrs

Your manager's response time  🕐 9.2 hrs

| Office 365 | Delve | | 🗨 🔔 ⚙ ? | Joe 612 |

🔍 Search mail and people

MyAnalytics < 11/13/2016 – 11/19/2016 >  Time Settings

Your time
Your stats are based on your email and calendar  Learn More

| Meeting Hours | Email Hours | Focus Hours | After Hours |
|---|---|---|---|
| Goal < 10 hrs | Goal < 10 hrs | Goal > 10 hrs | Goal < 5 hrs |
| 2.3 hrs | 4.3 hrs | 41.3 hrs | 1.1 hrs |
| Edit goal | Edit goal | Edit goal | Edit goal |

Stay in touch 614   Network
Important  Top Collaborators 610

🔍 Search to add

| Chris Basore | | Amit Agar | | Calvin Chan | | Mark Radner | |
|---|---|---|---|---|---|---|---|
| Total time | 1 hrs | Total time | 1 hrs | Total time | 1.6 hrs | Total time | 3.8 hrs |
| Read percent | 22.2% | Read percent | - | Read percent | 41.2% | Read percent | 92.3% |
| Response time | - | Response time | - | Response time | - | Response time | 2.3 hrs |

View details

Losing Touch 616
People you may want to catch up with

| 👤 Jeff Turke ✉ ▪ ✕ | 👤 John Knight ✉ ▪ ✕ | 👤 Karen Larson ✉ ▪ ✕ |
| Last connected Aug 15 | Last connected Sept 2 | Last connected Sept 30 |

Home
Me
MyAnalytics
Favorites

People
Chris Basore
Amit Agar
Alex Kamen
Tim Dettmer
Xuedong Huang
Calvin Chan
Mark Radner 604, 606, 608, 618, 620, 622, 600, 602

FIG. 6

PRODUCTIVITY INSIGHT DASHBOARD

BACKGROUND

Today, people interact with a variety of personal and workplace networks. Employees continually make decisions regarding how and with whom to allocate their time. Often projects are stymied and employees become frustrated with frequent unfocused meetings and collaborative interactions. Understanding employee time allocation to networks and collaboration are crucial to employee engagement and productivity. However, as people collaborate using a variety of communication types (e.g., texts, instant messages, emails, message boards, etc.) and in a variety of settings (e.g., in-person meetings, conference calls, video conferences, etc.), it is difficult for the employee to quantify and/or qualify interactions within his or her network and identify potential sources of productivity gains.

It is with respect to these and other general considerations that embodiments have been described. Also, although relatively specific problems have been discussed, it should be understood that the embodiments should not be limited to solving the specific problems identified in the background.

SUMMARY

The disclosure generally relates to a system and methods for providing productivity insights regarding user networks. As used herein, the term "user network" is not limited to the particular contacts and/or interactions identified for a user, but may involve and/or represent collaboration statistics, collaboration data analytics and/or collaboration insights across the user's sphere of electronic interactions. For instance, productivity insights serve to qualify and quantify collaborative relationships for individual employees so that they can leverage their time more effectively by collaborating better within their networks. This includes understanding the investment in these collaborative relationships, as well as whether they require more attention from the user or are receiving over attention. Productivity insights are determinable based on event data, such as email messaging events and/or calendaring events, and enable a user to see at a glance how and with whom the user has spent his or her time. Additionally, productivity insights highlight any changes that occur over time within a user network. Analytics based on event data allow a user to easily identify top collaborators, which may or may not be the most important collaborators, as well as specific metrics for each collaborator, such as response time, email read rate, total collaboration time, etc. Accordingly, productivity insights enable a user to proactively and decisively improve time allocation and workplace productivity.

In an aspect, a computer system is provided. The computer system including at least one processing unit and at least one memory storing computer executable instructions that, when executed by the at least one processing unit, cause the computer system to perform a method. The method includes collecting and storing event data for each of a plurality of overlapping windows of time and receiving a request including a parameter and a period of time, where the period of time corresponds to one or more of the overlapping windows of time. The method further includes sampling the stored event data to generate a continuous historical view over the period of time and calculating a historical snapshot of a user network over the period of time based at least in part on the parameter. Additionally, the method includes collecting event data for a current window of time and calculating a current snapshot of the user network over the current window of time. The method also includes determining a delta between the historical snapshot of the user network and the current snapshot of the user network.

In another aspect, a method for providing productivity insights regarding a user network is provided. The method includes collecting and storing event data for each of a plurality of consecutive windows of time. The method further includes receiving a request including a parameter and a period of time and collecting event data for a current window of time. Additionally, the method includes calculating a snapshot of the user network over the period of time based at least in part on the parameter, where the period of time encompasses at least the current window of time and one or more of the plurality of consecutive windows of time, and providing the snapshot.

In still another aspect, a computer-readable storage medium is provided. The computer-readable storage medium stores computer executable instructions that, when executed by a processing unit, cause a computing device to receive a request including a parameter and a period of time and collect event data for the period of time in real time. The computer executable instructions further causing the computing device to calculate a snapshot of the user network over the period of time based at least in part on the parameter and provide the snapshot.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 5A illustrates an interface for providing productivity insights regarding a user network, according to an example embodiment.

FIG. 5B illustrates an interface including a popup window for providing productivity insights regarding a user network, according to an example embodiment.

FIG. 6 illustrates an interface for providing productivity insights regarding a lost collaborator in a user network, according to an example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As described above, the disclosure generally relates to a system and methods for providing productivity insights regarding user networks. For instance, productivity insights serve to qualify and quantify collaborative relationships for individual employees so that they can leverage their time more effectively by collaborating better within their networks. This includes understanding the investment in these collaborative relationships, as well as whether they require more attention from the user or are receiving over attention. Productivity insights are determinable based on event data, such as email messaging events and/or calendaring events, and enable a user to see at a glance how and with whom the user has spent his or her time. Additionally, productivity insights highlight any changes that occur over time within a user network. Analytics based on event data allow a user to easily identify top collaborators, which may or may not be the most important collaborators, as well as specific metrics for each collaborator, such as response time, email read rate, total collaboration time, etc. Accordingly, productivity insights enable a user to proactively and decisively improve time allocation and workplace productivity.

Figure 1:
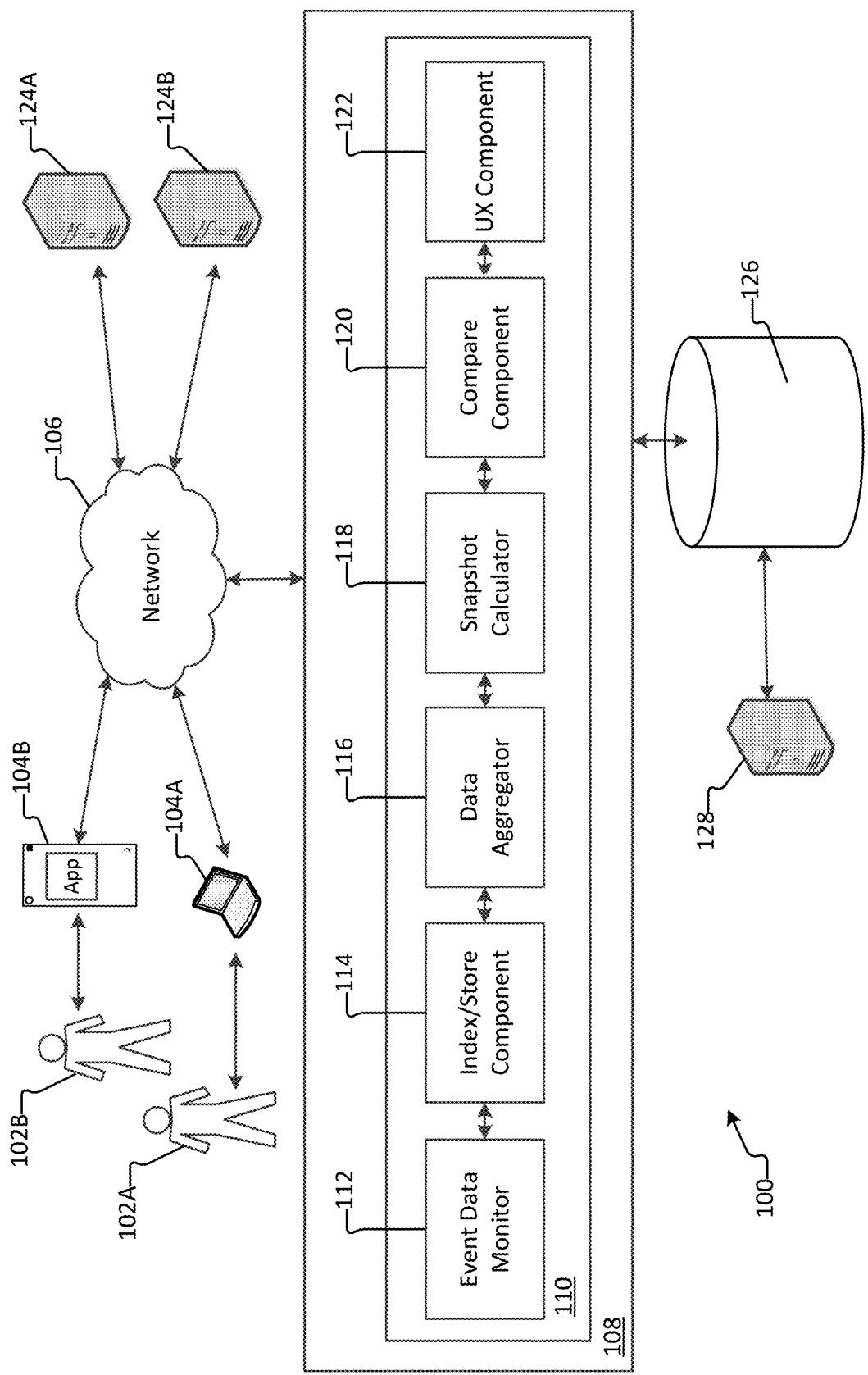
FIG. 1 illustrates a system for determining productivity insights, according to an example embodiment.

FIG. 1 illustrates a system for determining productivity insights, according to an example embodiment.

As illustrated, system 100 may include one or more client computing devices 104 (e.g., client computing devices 104A and 104B) that may execute a client version of a productivity insights application capable of calculating one or more snapshots of a user network to determine productivity insights. In some examples, the productivity insights application may execute locally on a client computing device 104. In other examples, a client productivity insights application (e.g., a mobile app on a thin client computing device 104) may operate in communication (e.g., via network 106) with a corresponding server version of productivity insights application 110 executing on one or more server computing devices, e.g., server computing device 108. In still other aspects, rather than executing a client version of a productivity insights application, the one or more client computing devices 104 may remotely access, e.g., over network 106, the productivity insights application 110 implemented on the server computing device 108 or multiple server computing devices (e.g., in a distributed computing environment such as a cloud-computing environment). In aspects, the productivity insights application, whether executed on a client, a server, or in a cloud-computing environment, may be integrated into or in communication with an electronic mail or messaging application, a calendaring application, a task application, and the like.

As illustrated by FIG. 1, a server version of productivity insights application 110 is implemented by server computing device 108. As should be appreciated, the server version of productivity insights application 110 may also be implemented in a distributed environment (e.g., cloud-computing environment) across a plurality of server computing devices (not shown). Moreover, as should be appreciated, either a client or a server version of the productivity insights application 110 may be calculating one or more snapshots of a user network to determine productivity insights. While a server version of the productivity insights application 110 and associated components 112-122 are shown and described, this should not be understood as limiting. Rather, a client version of productivity insights application 110 may similarly implement components 112-122 on a client computing device 104.

In a basic configuration, the one or more client computing devices 104 are personal or handheld computers having both input elements and output elements operated by one or more users 102 (e.g., user 102A and user 102B). In some instances, users 102A and 102B may include a sender and a receiver of an email, meeting request, task, etc. For example, the one or more client computing devices 104 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing a productivity insights application and/or remotely accessing productivity insights application 110 may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing device 108 may communicate with some components of the system via a local network (e.g., an enterprise intranet), whereas server computing device 108 may communicate with other components of the system via a wide area network (e.g., the Internet). In addition, the aspects and functionalities described herein may operate over distributed systems (e.g., cloud-computing systems), where application functionality, memory, data storage and retrieval, and various processing functions may be operated remotely from each other over a distributed computing network, such as the Internet or an intranet.

As described above, the productivity insights application 110 may be implemented on a server computing device 108. In a basic configuration, server computing device 108 may include at least a processing unit and a system memory for executing computer-readable instructions. In some aspects, server computing device 108 may comprise one or more server computing devices 108 in a distributed environment (e.g., cloud-computing environment). Server computing device 108 may monitor, collect, index and/or store event data between the one or more client computing devices 104 and/or one or more other server computing devices (e.g., server computing devices 122A and/or 122B) via network 106.

As used herein, monitoring event data may include monitoring one or more email messaging applications and/or one or more calendaring applications (e.g. Microsoft® Outlook®, Gmail®, Mozilla® Thunderbird®, etc.) to collect event data. For example, productivity insights application 110 may monitor email messaging applications and/or calendaring applications of one or more users within an organization or enterprise. Event data may include email messaging events, such as email send events, email receive events, email forward events, email read events, email reply events, email reply-all events, email dwell time (e.g., the length of time an email remained open), and the like. Event data may also include calendaring events, such as meeting invitation send events, meeting invitation receive events, meeting invitation accept events, meeting invitation tentative events, meeting invitation decline events, attendees of a meeting event, duration of a meeting event, organizer of a meeting event, and the like. As should be appreciated, sender, receiver and/or distribution list data may also be collected for any email or messaging event. Additionally, data regarding "how" an email and/or meeting invite was received may also be collected and analyzed; for example, to gain insights based on whether email messages or meeting invites were addressed directly to the recipient in the "To" field, versus indirectly in the carbon copy ("Cc") field, versus indirectly and privately in the blind carbon copy ("Bcc") field. Such additional data may further be utilized in any calculation or analysis described herein.

In some cases, the productivity insights application 110 may monitor interactions between internal users (e.g., employees within an organization); in other cases, the productivity insights application 110 may monitor interactions between internal and external users (e.g., individuals outside of an organization). Although the productivity insights application 110 may generally have access to the interactions of internal users, some interactions between internal and external users may not be captured. In this case, event data may primarily involve interactions between internal users and may include additional event data between internal and external users when available.

As should be appreciated, event data may be received and stored in one or more storage locations accessible to productivity insights application 110, e.g., storage 126. In at least some examples, the event data may be stored in different storage locations within a distributed environment (e.g., cloud-based computing environment) that is accessible to productivity insights application 110 over a network, e.g., network 106. As detailed above, the event data may be generated by one or more email applications and/or one or more calendaring applications (e.g., for one or more internal users) that may be hosted by server computing device 108 or by another server computing device (e.g., server computing devices 122A, 122B and/or 128) in communication with server computing device 108.

As illustrated in FIG. 1, the productivity insights application 110 may include various components for evaluating event data and providing productivity insights, including an event data monitor 112, an index/store component 114, a data aggregator 116, a snapshot calculator 118, a compare component 120, a UX component 122, and the like. In aspects, each component may communicate and pass data between the other components. The various components may be implemented using hardware, software, or a combination of hardware and software. Moreover, the various components may be executed on a single server computing device (e.g., server computing device 108), on multiple server computing devices (e.g., server computing devices 108, 122A, 122B and/or 128), or locally on a client computing device (e.g., client computing devices 104A and/or 104B).

As described above, the productivity insights application 110 may be configured to collect, index and store event data, aggregate event data, calculate one or more snapshots of a user network over one or more periods of time, compare snapshots and/or provide insights regarding user productivity based on the one or more snapshots. In aspects, event data monitor 112 may collect event data from one or more email applications and/or one or more calendaring applications over one or more windows of time (e.g., continuously based on a schedule of monitoring windows). In other aspects, event data monitor 112 may collect event data from one or more email applications and/or one or more calendaring applications in real time (e.g., at a current time of a request). As detailed above, event data may include email messaging events (e.g., email send events, email receive events, email forward events, email read events, email reply events, email reply-all events, etc.) and/or calendaring events (e.g., meeting invitation send events, meeting invitation receive events, meeting invitation accept events, meeting invitation tentative events, meeting invitation decline events, attendees of a meeting event, duration of a meeting event, organizer of a meeting event, etc.). For instance, the event data monitor 112 may collect event data corresponding to interactions between internal users (e.g., employees within a company) and, when available, the event data monitor 112 may collect event data corresponding to interactions between internal and external users (e.g., individuals outside of a company). Interactions between internal and external users may be available, for instance, when email applications and/or calendaring applications for external users are hosted by one or more servers accessible to the productivity insights application 110. In some cases, event data monitor 112 may execute on the same machine(s) (or on machine(s) within the same cluster on a shared network fabric) that are hosting the mailboxes of the monitored users' email messaging events and/or calendaring events to promote I/O or data efficiency.

In further aspects, index/store component 114 may receive event data from event data monitor 112 and may index and store the event data, e.g., in storage 126. For instance, index/store component 114 may index the event data based on one or more identifiers, such as a collaborator (e.g., a person within a user's internal or external network), a type of collaborator (e.g., internal or external), a type of event (e.g., email messaging event, calendaring event, etc.), a type of event data (e.g., email send events, email receive events, email forward events, email read events, email reply events, email reply-all events, meeting invitation send events, meeting invitation receive events, meeting invitation accept events, meeting invitation tentative events, meeting invitation decline events, attendees of a meeting event, duration of a meeting event, organizer of a meeting event, etc.), a window of time (one minute, one hour, one day, seven days, one calendar week, fourteen days, two calendar weeks, one month, six months, one year, etc.), a type of window (overlapping, rolling, consecutive, etc.), and the like. In some cases, the event data may be stored as a batch of event data. A batch may correspond to the window of time within which the event data was collected. For instance, a batch of data may be indexed and stored for each day, for each rolling seven day period, for each calendar week, for each of a plurality of overlapping windows of time (e.g., overlapping two week periods), for each of a plurality of consecutive windows of time (e.g., consecutive calendar weeks), etc.

Data aggregator 116 may aggregate event data stored over one or more windows. In aspects, data aggregator 116 may aggregate event data offline, in real time, or based on any combination of offline and real time processing. Whether the aggregation occurs offline, in real time, or based on some combination thereof may be determined based on processing resources, storage availability, network bandwidth, or otherwise, and different determinations may be made at different times. As should be appreciated, the chunks of aggregated event data may represent event data that was collected, indexed and stored over any suitable number of windows of time. In this way, the resulting chunks of aggregated event data enable the system to respond quickly to any request for information over any requested period of time.

In some cases, as noted above, productivity insights application 110 may receive a request for information based on event data (e.g., stored event data, current event data, event data queried in real time, etc.). A request may include, for example, a user-initiated query or search, a user selection of a predefined query or search, a machine-generated request (e.g., upon receiving a selection to launch a dashboard), and the like. In aspects, the request may include a period of time and at least one parameter. The period of time may be any period of time, e.g., a selected period of time, a default period of time, a user-defined period of time, etc., and may encompass one or more windows of time. The at least one parameter may be "top collaborators," "read rate for a particular collaborator," "read percent for a particular collaborator," "response time for a particular collaborator," "total time spent collaborating with a particular collaborator," "lost collaborator," and the like. For example, the request may be a request for top collaborators over the past four months, lost collaborators over the last four months, total time spent collaborating with a particular collaborator over the last week, etc. In other cases, the request may involve a real-time request, e.g., a request for information based on event data that is collected in real time (e.g., not previously collected and stored). Such a request, for instance, may involve a user-initiated query or search.

In some cases, e.g., where event data is collected and stored over a plurality of overlapping windows of time, data aggregator 116 may sample the aggregated event data to deduplicate event data corresponding overlapping periods within the overlapping windows. For instance, if each overlapping window is a rolling seven day window corresponding to the prior seven days, event data for a particular day within the seven day window may be collected up to seven times. In this case, data aggregator 116 may sample the aggregated event data to generate a complete historical view of unique, consecutive periods (e.g., days, weeks, etc.) within the requested period of time (e.g., weeks, months, four months, six months, etc.). Data aggregator 116 may sample aggregated event data offline, in real time, or based on any combination of offline and real time processing. Whether sampling occurs offline, in real time, or based on some combination thereof, may be determined based on processing resources, storage availability, network bandwidth, or otherwise, and different determinations may be made at different times.

Snapshot calculator 118 may calculate a snapshot of a user network over the requested period of time based at least in part on the requested parameter. Snapshot calculator 118 may calculate the historical snapshot offline, in real time, or based on any combination of offline and real time processing. Whether calculating occurs offline, in real time, or based on some combination thereof, may be determined based on processing resources, storage availability, network bandwidth, or otherwise, and different determinations may be made at different times. For instance, snapshot calculator 118 may calculate a snapshot of a user's top collaborators (e.g., requested parameter) over the past month (e.g., period of time). Top collaborators may be identified based on total time in collaboration over the past month, read percent over the past month, response time over the past month, and the like. In further examples, top collaborators may be ranked. For instance, the first top collaborator may be based on the highest total time in collaboration relative to other collaborators within the user network, the second top collaborator may have the next highest total time in collaboration relative to other collaborators within the user network, and so on. Alternatively, top collaborators may be identified based on a combination of factors listed above.

In other aspects, snapshot calculator 118 may calculate a historical snapshot of a user network and a current snapshot of a user network. For instance, the historical snapshot may correspond to a snapshot of a user network over the requested period of time based at least in part on the requested parameter, as described above. In contrast, a current snapshot may be calculated based on current event data collected in real time at the time of the request. In aspects, current event data may be collected in real time over the same window of time used to collect the historical event data. That is, if the event data monitor 112 collected event data for overlapping one week windows, event monitor 112 may collect current event data for the most recent one week window. In this case, a current snapshot of the user network may be calculated for the current period (e.g., most recent window) based at least in part on the requested parameter.

When a historical snapshot of a user network and a current snapshot of the user network have been calculated, compare component 120 may compare the historical and current snapshots to identify one or more differences, or deltas, between the snapshots. For instance, if Chris Basore was a top collaborator in the historical snapshot, but is no longer a top collaborator in the current snapshot, compare component 120 may identify Chris Basore as a lost collaborator. Alternatively, if a user response time statistically increased for a particular collaborator, compare component 120 may identify the increase in response time as a delta. Alternatively still, if a user read percent statistically decreased for a particular collaborator, compare component 120 may identify the decrease in read percent as a delta. In some cases, the relative deltas for different individuals identified as lost collaborators may be ranked and used provide better insights into a user's collaborative behavior. As should be appreciated, compare component 120 may identify deltas between a historical and current snapshot based on any monitored parameter.

UX component 120 may communicate with one or more other components to provide an interface or dashboard for presenting one or more productivity insights. Productivity insights may involve analyzing one or more snapshots of a user network and identifying quantitative and/or qualitative calculations, inferences, deductions, conclusions, generalizations, summaries, etc., based on the analyzed one or more snapshots. In aspects, UX component 120 may provide a dashboard presenting a plurality of top collaborators, along with quantitative information such as total time in collaboration, read percent, response time, etc., for each top collaborator. Additionally or alternatively, the dashboard may identify qualitative productivity insights based on an analysis of the one or more snapshots, e.g., "your read percent decreased by 5% for Amit Agar this week" or "your collaboration with your manager increased 0.4 hours this week." In further aspects, UX component 120 may provide recommendations to a user based on the analyzed snapshots, e.g., "you may want to catch up with Jeff Turke, you last collaborated on August 15" or "your read percent fell 5% for Calvin Chan last week and you have 5 unread emails," etc. UX component 120 may also provide a means for acting on a recommendation or productivity insight, e.g., a link to unread email messages, a link to send an email message, a link to set up a meeting, etc.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
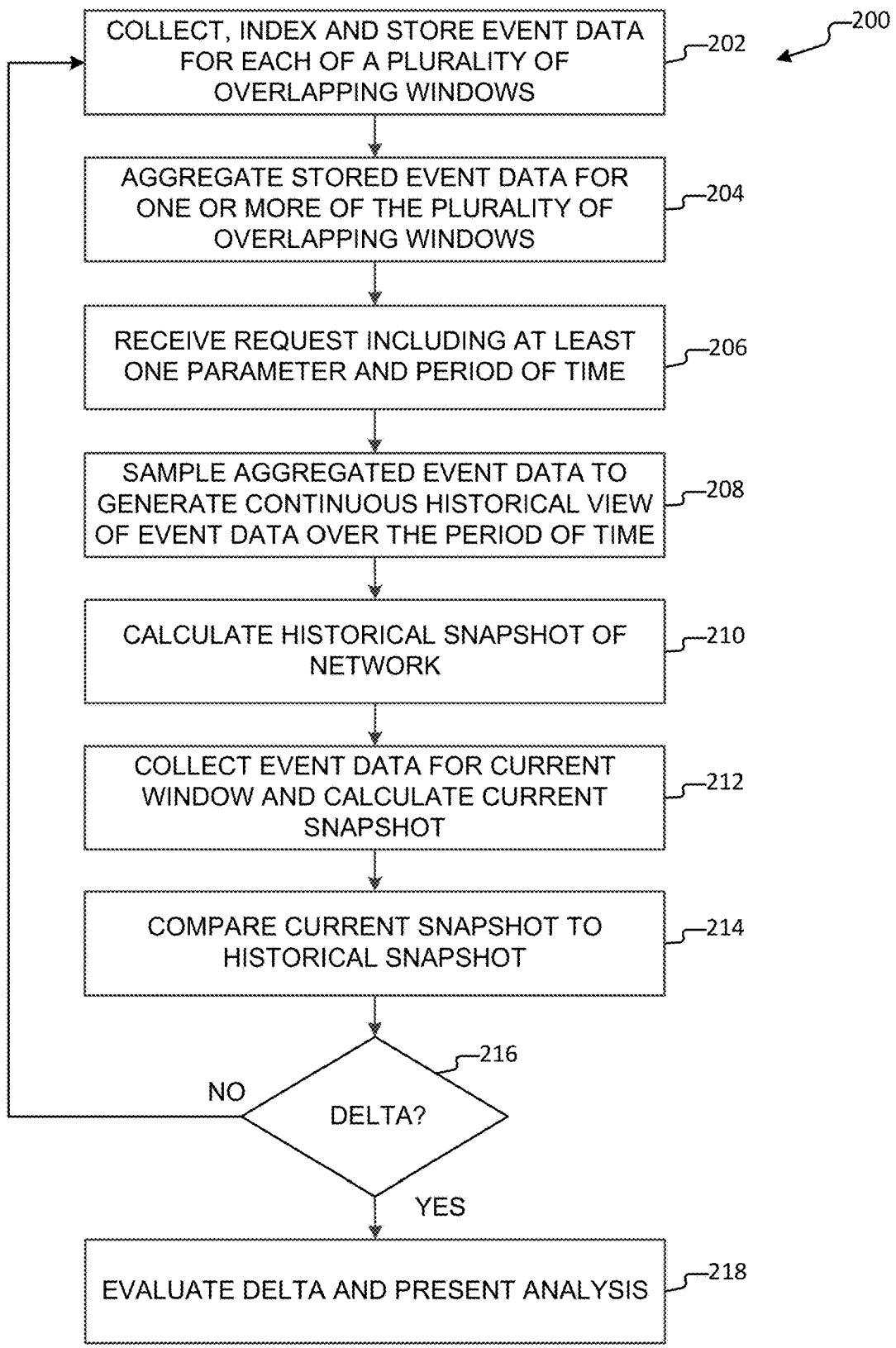
FIG. 2 illustrates a method for determining a change between a historical snapshot and a current snapshot of a user network, according to an example embodiment.

FIG. 2 illustrates a method for determining a change between a historical snapshot and a current snapshot of a user network, according to an example embodiment.

Method 200 begins with collect/index/store event data operation 202, where an event data monitor 112 may collect event data from one or more email applications and/or one or more calendaring applications over one or more windows of time (e.g., continuously based on a schedule of overlapping windows). As further provided, an index/store component 114 may receive event data from event data monitor 112 and may index and store the event data. For instance, event data may be indexed based on one or more identifiers, such as a collaborator (e.g., a person within a user's internal or external network), a type of collaborator (e.g., internal or external), a type of event (e.g., email messaging event, calendaring event, etc.), a type of event data (e.g., email send events, email receive events, email forward events, email read events, email reply events, email reply-all events, email dwell time, meeting invitation send events, meeting invitation receive events, meeting invitation accept events, meeting invitation tentative events, meeting invitation decline events, attendees of a meeting event, duration of a meeting event, organizer of a meeting event, etc.), a window of time (one minute, one hour, one day, seven days, one calendar week, fourteen days, two calendar weeks, one month, six months, one year, etc.), a type of window (overlapping, rolling, consecutive, etc.), and the like. In some cases, the event data may be stored as a batch of event data. A batch may correspond to the window of time within which the event data was collected. For instance, a batch of data may be indexed and stored for each day, for each rolling seven day period, for each calendar week, for each of a plurality of overlapping windows of time (e.g., overlapping two week periods), for each of a plurality of consecutive windows of time (e.g., consecutive calendar weeks), etc.

At aggregate operation 204, collected, indexed and stored event data may be aggregated over one or more windows. In aspects, data aggregator 116 of the productivity insights application 110 may aggregate event data stored over one or more windows of time. In aspects, data aggregator 116 may aggregate event data offline, in real time, or based on any combination of offline and real time processing, as described above. As should be appreciated, the chunks of aggregated event data may represent event data that was collected, indexed and stored over any suitable number of windows of time. In this way, the resulting chunks of aggregated event data enable the system to respond quickly to any request for information over any requested period of time.

At receive request operation 206, a request for information based on event data may be received (e.g., based on stored event data, current event data, event data queried in real time, etc.). In aspects, the request may include, for example, a user-initiated query or search, a user selection of a predefined query or search, a machine-generated request (e.g., upon receiving a selection to launch a dashboard), and the like. The request may further include a period of time and at least one parameter. The period of time may be any period of time, e.g., a selected period of time, a default period of time, a user-defined period of time, etc., and may encompass one or more windows of time. The at least one parameter may be any parameter determinable based on event data, e.g., "top collaborators," "read rate for a particular collaborator," "read percent for a particular collaborator," "response time for a particular collaborator," "total time spent collaborating with a particular collaborator," "lost collaborator," and the like. For example, the request may be based on stored event data and/or current event data, e.g., a request for top collaborators over the past four months, lost collaborators over the last four months, total time spent collaborating with a particular collaborator, etc. Alternatively, the request may involve determining a change (or delta) between stored event data (e.g., a historical view) and current event data (e.g., a current view).

At sample operation 208, the aggregated event data may be sampled to deduplicate event data corresponding overlapping periods within the overlapping windows. In aspects, data aggregator 116 of the productivity insights application 110 may sample the aggregated event data. For instance, if each overlapping window is a rolling seven day window corresponding to the prior seven days, event data for a particular day within the seven day window may be collected up to seven times. In this case, the aggregated event data may be sampled to generate a complete historical view of unique, consecutive periods (e.g., days, weeks, etc.) within the requested period of time (e.g., weeks, months, four months, six months, etc.). In aspects, data aggregator 116 may sample aggregated event data offline, in real time, or based on any combination of offline and real time processing, as described above.

At calculate historical snapshot operation 210, a historical snapshot of a user network over the requested period of time may be calculated based at least in part on the requested parameter. In aspects, snapshot calculator 118 of the productivity insights application 110 may calculate the historical snapshot. Snapshot calculator 118 may calculate the historical snapshot offline, in real time, or based on any combination of offline and real time processing, as described above. For instance, based on the historical view of event data, the historical snapshot may be calculated for a user's top collaborators (e.g., the requested at least one parameter) over the past month (e.g., the requested period of time). Top collaborators may be identified based on total time in collaboration over the past month, read percent over the past month, response time over the past month, and the like. In further examples, top collaborators may be ranked. For instance, the first top collaborator may be based on the highest total time in collaboration relative to other collaborators within the user network, the second top collaborator may have the next highest total time in collaboration relative to other collaborators within the user network, and so on.

At current event data operation 212, the event data monitor 112 may collect current event data from one or more email applications and/or one or more calendaring applications for a current window of time. In aspects, current event data may be collected in real time over the same window of time used to collect the historical event data. That is, if the historical event data was collected for overlapping one week windows, the current event data may be collected for the most recent one week window. In this case, snapshot calculator 118 may calculate a current snapshot of the user network for the current period (e.g., most recent window) based at least in part on the requested parameter. For instance, based on the current event data, a current snapshot may be calculated for a user's top collaborators (e.g., requested at least one parameter) over the past week (e.g., most recent window). In this case, top collaborators may be identified based on total time in collaboration over the past week, read percent over the last week, response time over the past week, and the like. As detailed above, top collaborators may be ranked. For instance, the first top collaborator may be based on the highest total time in collaboration relative to other collaborators within the user network over the past week, the second top collaborator may have the next highest total time in collaboration relative to other collaborators within the user network over the past week, and so on.

At compare operation 214, the historical snapshot may be compared to the current snapshot. In aspects, compare component 120 may compare the historical and current snapshots to identify one or more changes, or deltas, between the snapshots. For instance, if Chris Basore was a top collaborator in the historical snapshot, but is no longer a top collaborator in the current snapshot, this change (or delta) may be identified by compare component 120. Alternatively, if a user response time statistically increased for a particular collaborator, the increase in response time may be identified as a delta. Alternatively still, if a user read percent statistically decreased for a particular collaborator, the decrease in read percent may be identified as a delta. As should be appreciated, deltas may be identified between a historical snapshot and a current snapshot based on any parameter determinable by the event data.

At determination operation 216, it may be determined whether there is a delta (or difference) between the historical snapshot and the current snapshot, as described above. If a delta is identified, the method may proceed to evaluate operation 218. If a delta is not identified, the method may return to collect/index/store event data operation 202.

At evaluate operation 218, the delta between the historical snapshot and the current snapshot may be analyzed. For instance, as described above, if Chris Basore was a top collaborator in the historical snapshot, but is no longer a top collaborator in the current snapshot, Chris Basore may be identified as a lost collaborator. In this case, a recommendation may be provided e.g., "you may want to catch up with Chris Basore, you last collaborated on August 15." Additionally, a means for acting on the recommendation or productivity insight may be provided, e.g., a link to unread email messages, a link to send an email message, a link to set up a meeting, etc.

Alternatively, if a user read percent statistically decreased for a particular collaborator, the decrease in read percent may be analyzed to determine if the delta is indicative of a productivity concern. In aspects, evaluating identified deltas between a historical snapshot and a current snapshot enables the productivity insights application 110 to provide qualitative and quantitative productivity insights to a user regarding his or her network. For example, productivity insights may be presented in a dashboard including a plurality of top collaborators, along with quantitative information such as total time in collaboration, read percent, response time, etc., for each top collaborator. Additionally or alternatively, the dashboard may provide productivity insights such as "your read percent decreased by 5% for Amit Agar this week" or "your collaboration with your manager increased 0.4 hours this week." In some cases, a graphical representation of one or more productivity insights may be provided, e.g., a bar graph, line graph, pie graph, etc., representing a read percent, a response time, a total collaboration time, a percent of goal, etc.

As should be appreciated, operations 202-218 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 3:
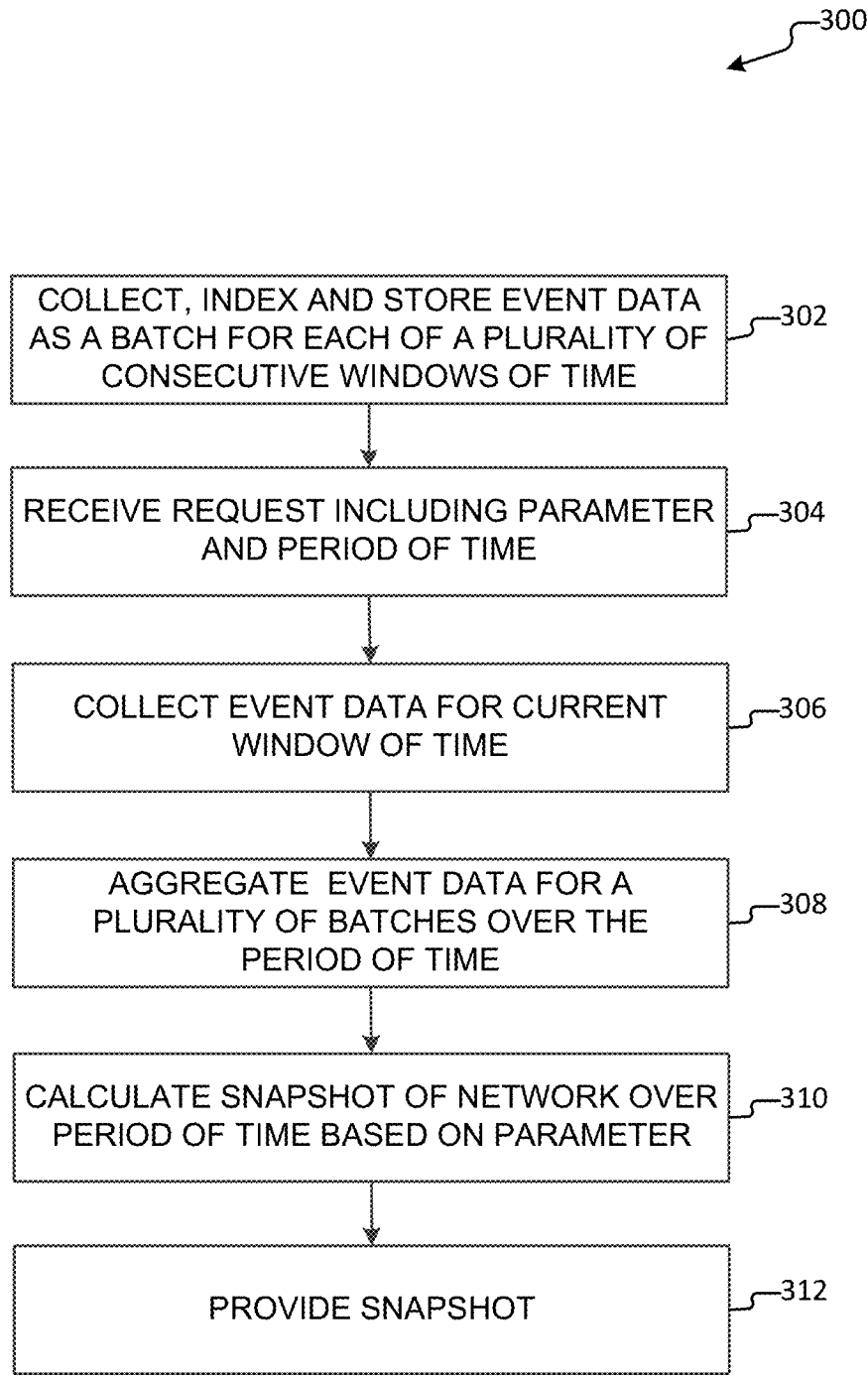
FIG. 3 illustrates a method for calculating a snapshot of a user network, according to an example embodiment.

FIG. 3 illustrates a method for calculating a snapshot of a user network, according to an example embodiment.

Method 300 begins with collect/index/store event data operation 302, similar to collect/index/store event data operation 302, where an event data monitor 112 may collect event data from one or more email applications and/or one or more calendaring applications over one or more windows of time (e.g., continuously based on a schedule of consecutive windows). As further provided, an index/store component 114 may receive event data from event data monitor 112 and may index and store the event data. For instance, event data may be indexed based on one or more identifiers, as described above. In some cases, the event data may be stored as a batch of historical event data. A batch may correspond to the window of time within which the event data was collected. For instance, a batch of data may be indexed and stored for each day, for each rolling seven day period, for each calendar week, for each of a plurality of consecutive windows of time (e.g., consecutive calendar weeks), etc.

At receive request operation 304, a request for information based on event data may be received. In aspects, the request may include, for example, a user selection of a predefined query or search, a machine-generated request (e.g., upon receiving a selection to launch a dashboard), and the like. The request may further include a period of time and at least one parameter. The period of time may be any period of time, e.g., a selected period of time, a default period of time, a user-defined period of time, etc., and may encompass one or more windows of time. The at least one parameter may be any parameter determinable based on event data, as described above. For example, the request may be based on stored event data and/or current event data, e.g., a request for top collaborators, total time spent collaborating with a particular collaborator, etc.

At current event data operation 306, the event data monitor 112 may collect current event data from one or more email applications and/or one or more calendaring applications for a current window of time. In aspects, current event data may be collected in real time over the same window of time used to collect the historical event data. That is, if the historical event data was collected for consecutive one week windows, the current event data may be collected for the most recent one week window.

At aggregate operation 308, collected, indexed and stored event data may be aggregated with the current event data over one or more windows corresponding to the period of time. In aspects, data aggregator 116 of the productivity insights application 110 may retrieve historical event data (e.g., that was indexed and stored over one or more windows) and aggregate such historical event data with the current event data for the period of time. For instance, if event data was stored over a plurality of consecutive calendar weeks and the period of time is one calendar month, data aggregator 116 may aggregate historical event data (e.g., for at least a subset of the plurality of consecutive one week windows) with the current event data (e.g., collected for the most recent one week window) such that event data for each day of the last calendar month is represented. As should be appreciated, windows of time (corresponding to event data collection) and periods of time (corresponding to a request) may be of any length or combination of lengths.

At calculate snapshot operation 310, a snapshot of a user network over the requested period of time (including the current window of time) may be calculated based at least in part on the requested parameter. For instance, based on the aggregated event data, the snapshot may be calculated for a user's top collaborators (e.g., the requested at least one parameter) over the past month (e.g., the requested period of time). Top collaborators may be identified based on total time in collaboration over the past month, read percent over the past month, response time over the past month, and the like. In further examples, top collaborators may be ranked. For instance, the first top collaborator may be based on the highest total time in collaboration relative to other collaborators within the user network, the second top collaborator may have the next highest total time in collaboration relative to other collaborators within the user network, and so on.

At provide operation 312, the snapshot may be provided. For instance, one or more top collaborators for the user may be presented, along with a total time spent collaborating, a user read percent and a response time for each top collaborator. In this way, qualitative and quantitative productivity insights may be provided to a user regarding his or her network. In aspects, the productivity insights may be presented in a dashboard, such as "your read percent decreased by 5% for Amit Agar this week" or "your collaboration with your manager increased 0.4 hours this week." In some cases, a graphical representation of one or more productivity insights may be provided, e.g., a bar graph, line graph, pie graph, etc., representing a read percent, a response time, a total collaboration time, a percent of goal, etc.

As should be appreciated, operations 302-312 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 4:
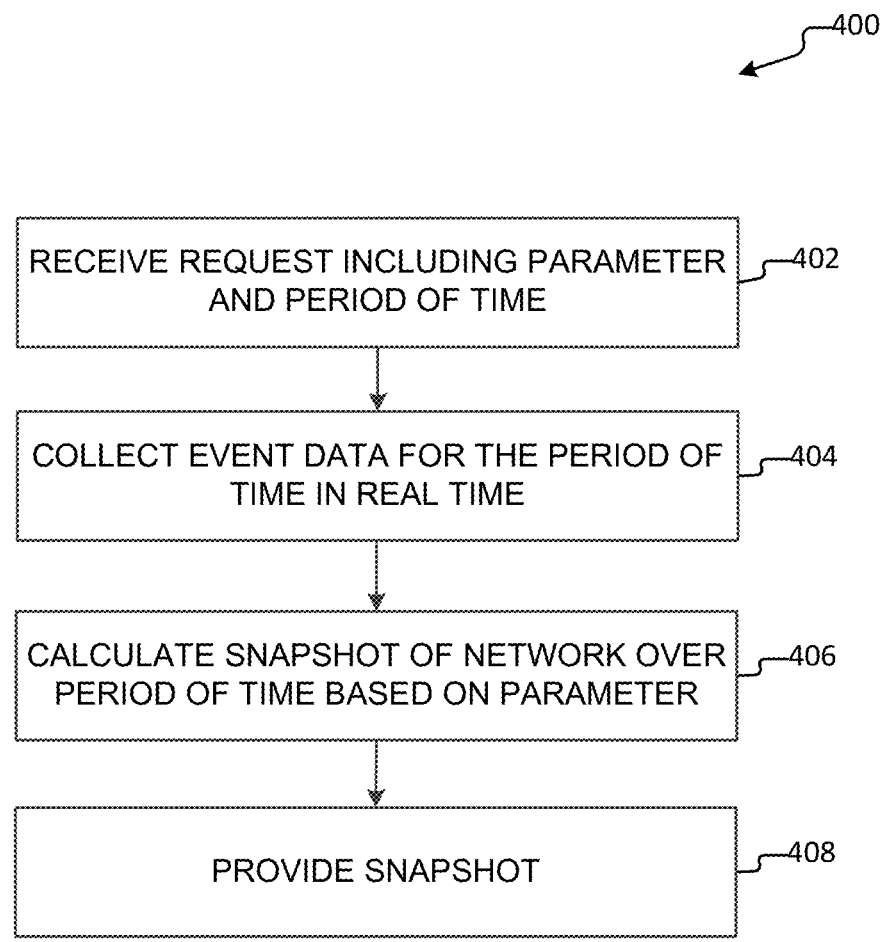
FIG. 4 illustrates a method for calculating a snapshot of a user network in real time, according to an example embodiment.

FIG. 4 illustrates a method for calculating a snapshot of a user network in real time, according to an example embodiment.

Method 400 begins with receive request operation 402, where a request for information based on event data may be received. In aspects, the request may include, for example, a user-defined query, a user selection of a predefined query or search, a machine-generated request (e.g., upon receiving a selection to launch a dashboard), and the like. The request may further include a period of time and at least one parameter. The period of time may be any period of time, e.g., a selected period of time, a default period of time, a user-defined period of time, etc. The at least one parameter may be any parameter determinable based on event data, as described above. For example, the request may query top collaborators over the past month, total time spent collaborating with a particular collaborator over the past week, etc.

At collect event data operation 404, the event data monitor 112 may collect event data from one or more email applications and/or one or more calendaring applications in real time for the period of time. That is, event data may not have been previously indexed and stored for the period of time. In this case, collecting event data in real time may involve an increase in processing resources in comparison with retrieving at least some indexed and stored event data for the period of time. In some instances, e.g., where productivity insights application 110 is executing on a server and accessed by a client via a browser, processing resources may be available for collecting event data in real time.

At calculate snapshot operation 406, a snapshot of a user network over the requested period of time may be calculated based at least in part on the requested parameter. For instance, based on the collected event data, the snapshot may be calculated for a user's top collaborators (e.g., the requested at least one parameter) over the past month (e.g., the requested period of time). Top collaborators may be identified, as described above, and may be ranked. For instance, the first top collaborator may be based on the highest total time in collaboration relative to other collaborators within the user network, the second top collaborator may have the next highest total time in collaboration relative to other collaborators within the user network, and so on.

At provide operation 408, the snapshot may be provided. For instance, one or more top collaborators for the user may be presented, along with a total time spent collaborating, a user read percent and a response time for each top collaborator. In this way, qualitative and quantitative productivity insights may be provided to a user regarding his or her network. In aspects, the productivity insights may be presented in a dashboard, which may further provide a graphical representation of one or more productivity insights, e.g., a bar graph, line graph, pie graph, etc., representing a read percent, a response time, a total collaboration time, a percent of goal, etc.

As should be appreciated, operations 402-408 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIG. 5A illustrates an interface for providing productivity insights regarding a user network, according to an example embodiment.

As illustrated, an interface 500 of a productivity insights application is provided. Interface 500 includes a navigation pane 502 and a dashboard 504. As illustrated, dashboard 504 includes one or more productivity insights panes 506. In particular, dashboard 504 includes network productivity insights pane 508. Network productivity insights pane 508 may further provide one or more productivity insights regarding a user network. For instance, a "stay in touch" area 514 may provide productivity insights regarding one or more top collaborators 510 for user 512 (i.e., "Joe").

As described above, a top collaborator 510 may be identified based on event data over some period of time. A top collaborator 510 may be identified, for instance, based on a total collaboration time with the collaborator relative to other collaborators within a user network. Total collaboration time may be calculated based on a user's time in meetings with various collaborators, time sending and replying to email messages between various collaborators, etc., over some relevant time period (e.g., today, the past week, the past two weeks, etc.). As should be appreciated, productivity insights may be different over different periods of time, i.e., productivity insights for the past week may be different than productivity insights for the past month. For each top collaborator 510, productivity insights such as total collaboration time, read percent and response time may further be calculated and provided. For instance, read percent may correspond to the percentage of email messages received from the top collaborator 510 have been read by the user 512. A response time may correspond to an average amount of time it takes user 512 to respond to correspondence (e.g., an email message, meeting request, etc.) from the top collaborator 510 over the relevant time period.

As further illustrated, network productivity insights pane 508 may include a "you and your manager" area 516, which may provide one or more productivity insights regarding interactions between user 512 and his or her manager. For instance, total collaboration time may be provided for the relevant time period, as well as any change over a prior time period. As illustrated, user 512 collaborated with his manager, Mark Radner, for 3.8 hours during the relevant time period, which represented an increase of 0.4 hours over the prior time period. In this case, the relevant time period and the prior time period are not specified but may be any length of time (e.g., one week, two weeks, one month, etc.). Additionally, "you and your manager" area 516 may provide productivity insights such as one-on-one (1:1) meeting time, email read rate, user response time and manager response time for user 512. As illustrated, user 512 spent 0.5 hours in one-on-one meetings with his manager, had a 92.3% email read rate, had a response time of 2.3 hours and had a manager response time of 9.2 hours.

As should be appreciated, the illustrated productivity insights are provided for purposes of explanation and are not intended to be limiting. Indeed, any productivity insight determinable based on event data may be provided in dashboard 504. As explained above, productivity insights enable a user to quickly and easily qualify and quantify his or her network. That is, the user is able to see at a glance how and with whom the user has spent his or her time. Additionally, the user is promptly apprised of any changes that occur over time within his or her collaborative relationships. Analytics based on event data allow a user to identify the top collaborators in his or her network, which may or may not be the most important collaborators. As well, a user is able to quickly identify improvement or concerns in areas such as response time, email read rate, total collaboration time with the appropriate collaborators, etc. Accordingly, the productivity insights provided via dashboard 504 enable a user to proactively and decisively improve time allocation and workplace productivity.

As should be appreciated, the various devices, components, etc., described with respect to FIG. 5A are not intended to limit the systems and methods to the particular components described. Accordingly, additional topology configurations may be used to practice the methods and systems herein and/or some components described may be excluded without departing from the methods and systems disclosed herein.

Figure 5B:
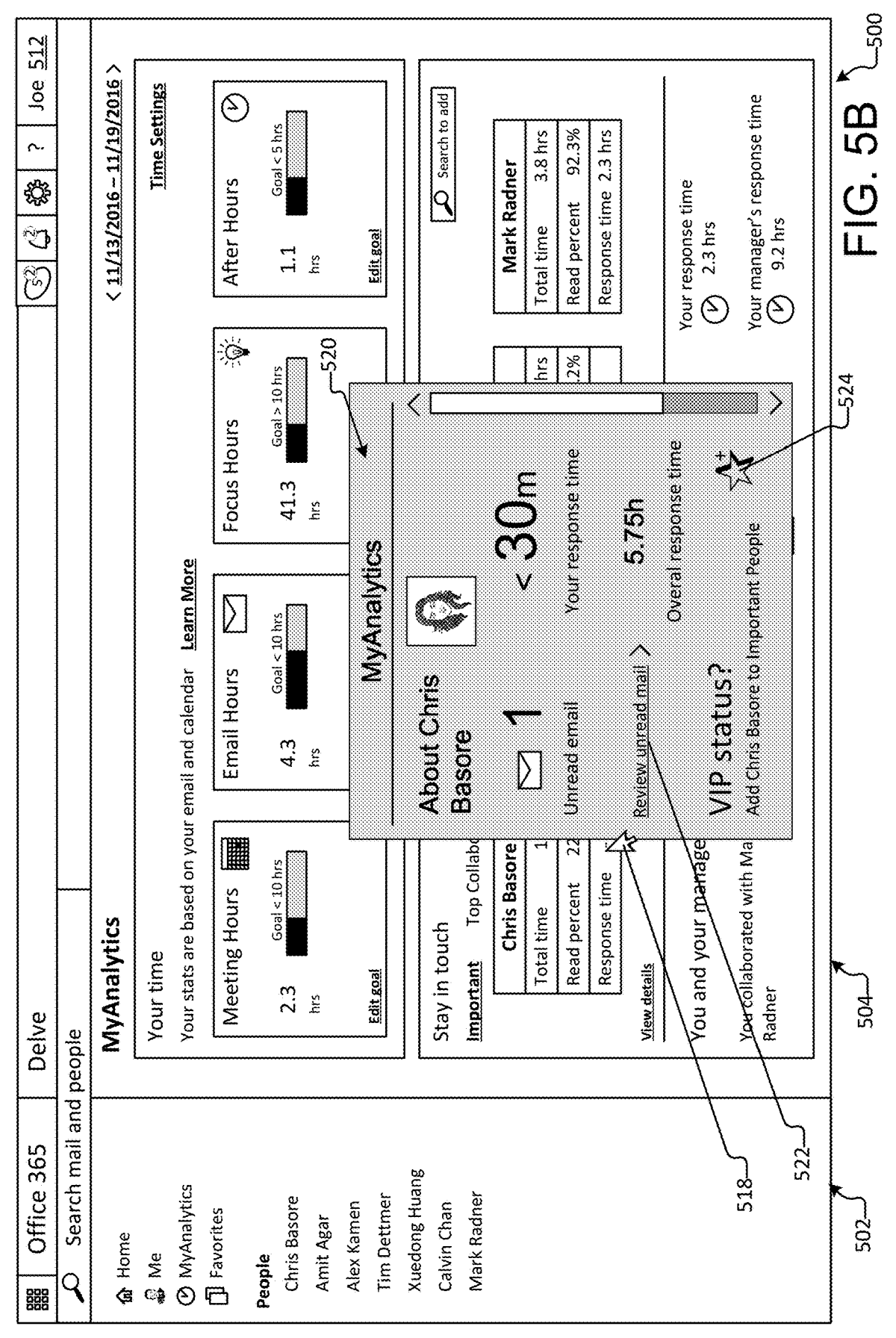

FIG. 5B illustrates an interface including a popup window for providing productivity insights regarding a user network, according to an example embodiment.

Similar to FIG. 5A, FIG. 5B illustrates interface 500 of a productivity insights application, which includes navigation pane 502 and dashboard 504. In this case, upon selecting a top collaborator 510 (e.g., by hovering, clicking, or otherwise, using cursor 518), a popup window 520 may be displayed. For instance, top collaborator Chris Basore may be selected.

As illustrated, popup window 520 provides specific productivity insights with respect to a particular top collaborator, e.g., Chris Basore. For instance, popup window 520 may identify a number of unread email messages from the top collaborator 510, as well as a link 522 for opening and reviewing unread email. In this case, user 512 has not read one (1) email from top collaborator Chris Basore. Additionally, a response time for user 512 with respect to a selected top collaborator 510 may be provided. In this case, user 512 has a response time of less than thirty minutes (<30 m) with respect to top collaborator Chris Basore. Additionally still, an overall response time for user 512 with respect to all collaborators may be displayed. In this case, user 512 has an overall response time of five and three-quarters hours (5.75 h) with respect to all collaborators. Popup window 520 may further provide a very important person (VIP) control 522 for adding the selected top collaborator 510 to an "important person" status. As should be appreciated, the illustrated productivity insights are provided for purposes of explanation and are not intended to be limiting. Indeed, any productivity insight determinable based on event data may be provided in popup window 520.

As should be appreciated, the various devices, components, etc., described with respect to FIG. 5B are not intended to limit the systems and methods to the particular components described. Accordingly, additional topology configurations may be used to practice the methods and systems herein and/or some components described may be excluded without departing from the methods and systems disclosed herein.

FIG. 6 illustrates an interface for providing productivity insights regarding a lost collaborator in a user network, according to an example embodiment.

Similar to FIGS. 5A and 5B, FIG. 6 illustrates interface 600 of a productivity insights application. Interface 600 includes a navigation pane 602 and a dashboard 604. As illustrated, dashboard 604 includes one or more productivity insights panes 606. In particular, dashboard 604 includes network productivity insights pane 608. Network productivity insights pane 608 may further provide one or more productivity insights regarding a user network. For instance, a "stay in touch" area 614 may provide productivity insights regarding one or more top collaborators 610 for user 612 (i.e., "Joe").

Additionally, network productivity insights pane 608 may include a "losing touch" area 616, which may provide notifications regarding collaborators with whom user 512 may have lost contact. As described above, a lost collaborator may be identified by comparing a historical snapshot of top collaborators to a current snapshot of top collaborators. In this case, if an individual was a top collaborator in the historical snapshot, but is no longer a top collaborator in the current snapshot, this individual may be identified as a lost collaborator. As illustrated, the "losing touch" area 616 identifies three individuals, i.e., Jeff Turke, John Knight and Karen Larson, as lost collaborators. In each instance, the last date that user 612 had contact with the lost collaborator is provided, as well as links for contacting the last collaborator. For example, email link 618 enables user 612 to send the lost collaborator an email, whereas calendar link 620 enables user 612 to send a meeting invitation to the lost collaborator. Delete control 622 allows user 612 to delete the notification regarding the lost collaborator.

As should be appreciated, the various devices, components, etc., described with respect to FIG. 6 are not intended to limit the systems and methods to the particular components described. Accordingly, additional topology configurations may be used to practice the methods and systems herein and/or some components described may be excluded without departing from the methods and systems disclosed herein.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, as described herein.

Figure 7:
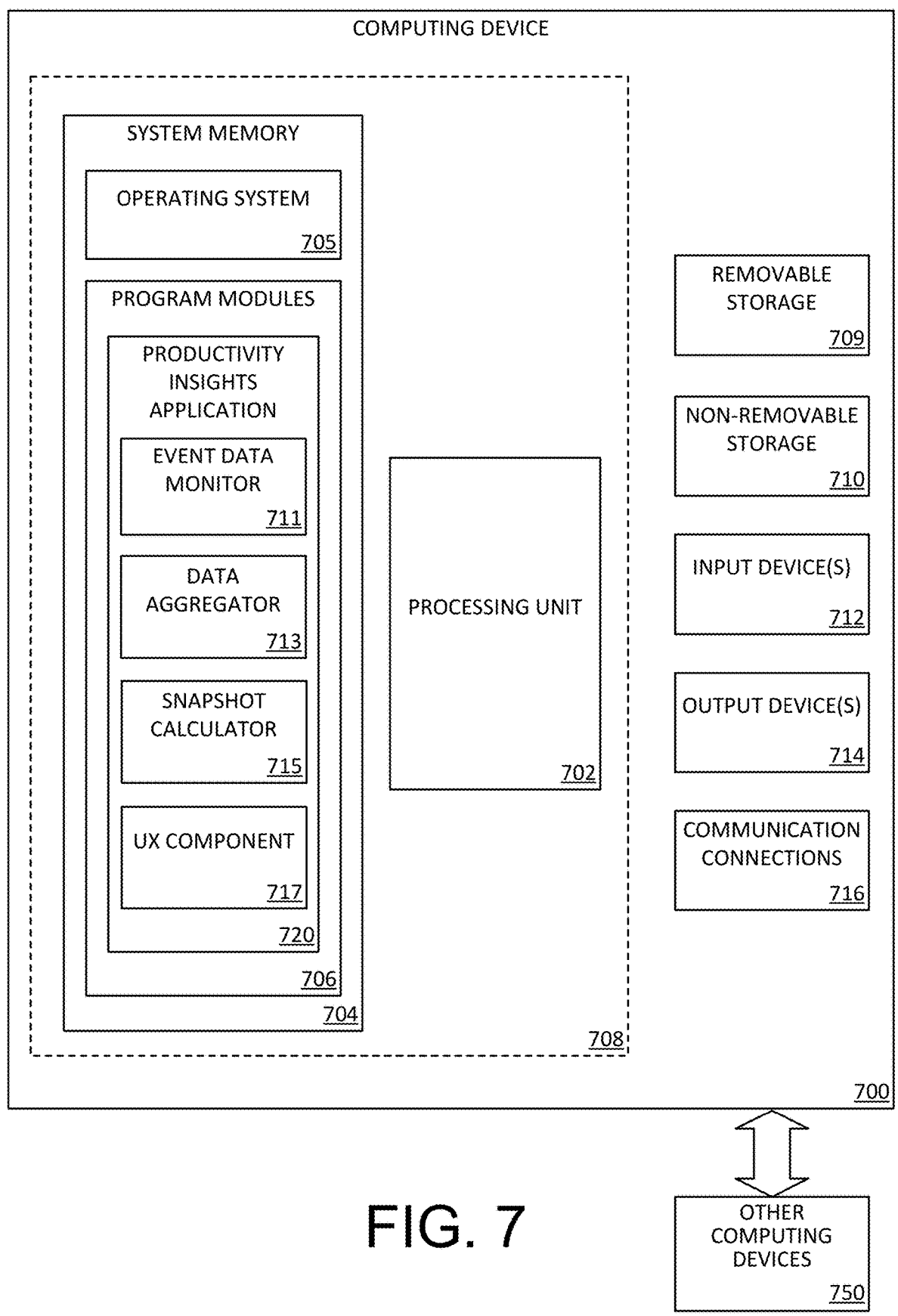
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may have computer executable instructions for implementing a productivity insights application 720 on a computing device (e.g., server computing device 108 and/or client computing device 104), including computer executable instructions for productivity insights application 720 that can be executed to implement the methods disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running productivity insights application 720, such as one or more components with regard to FIG. 1 and, in particular, event data monitor 711 (e.g., including event data monitor 112 and index/store component 114), data aggregator 713 (e.g., corresponding to data aggregator 116), snapshot calculator 715 (e.g., corresponding to snapshot calculator 118 and compare component 120), and/or UX component 717 (e.g., corresponding to UX component 122).

The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., productivity insights application 720) may perform processes including, but not limited to, the aspects, as described herein. Other program modules that may be used in accordance with aspects of the present disclosure, and in particular for providing productivity insights regarding a user network, may event data monitor 711, data aggregator 713, snapshot calculator 715, and/or UX component 717, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include non-transitory, volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media may be non-transitory media that does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
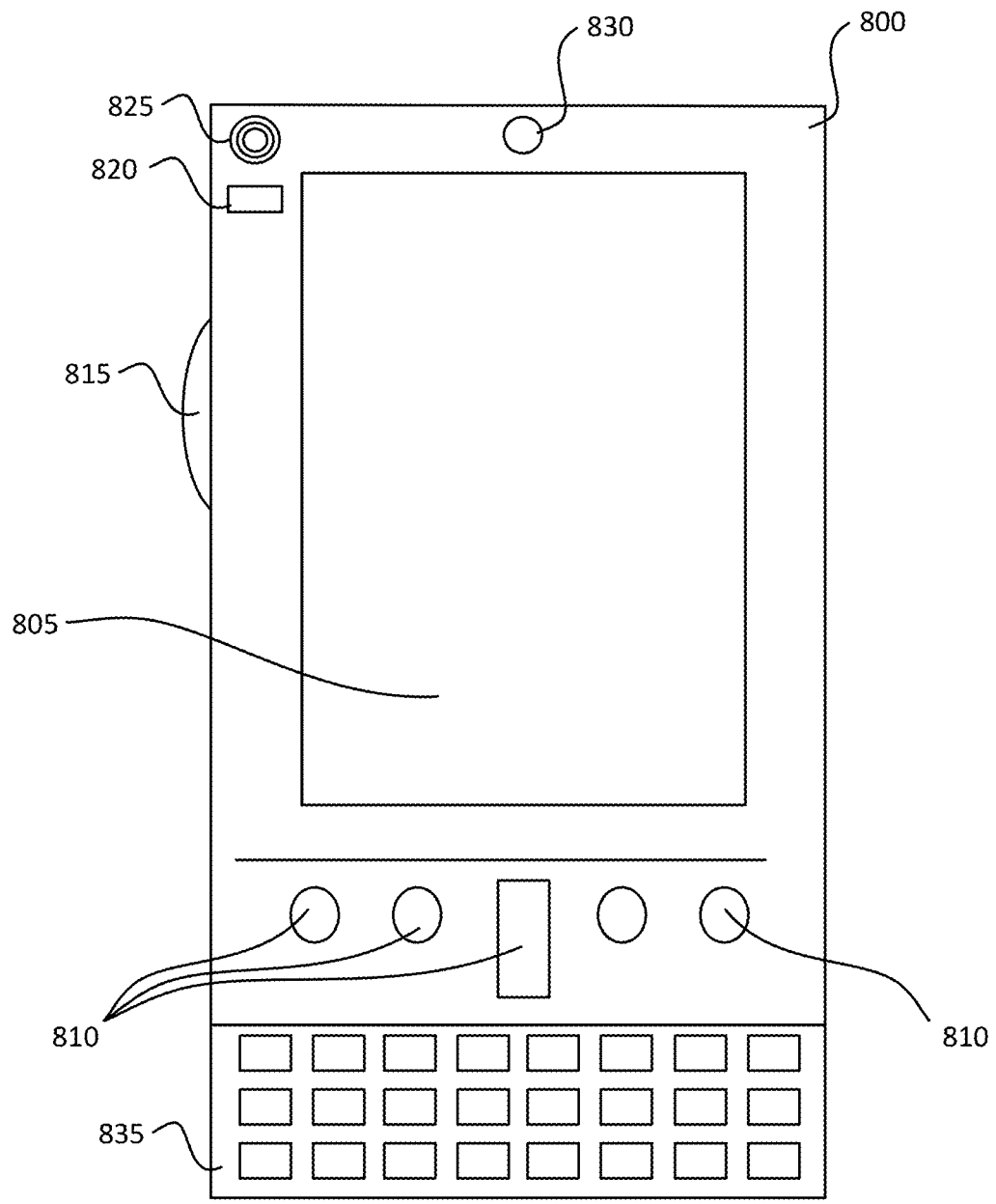
FIGS. 8A and 8B are simplified block diagrams of a mobile computing device with which aspects of the present disclosure may be practiced.
Figure 8B:
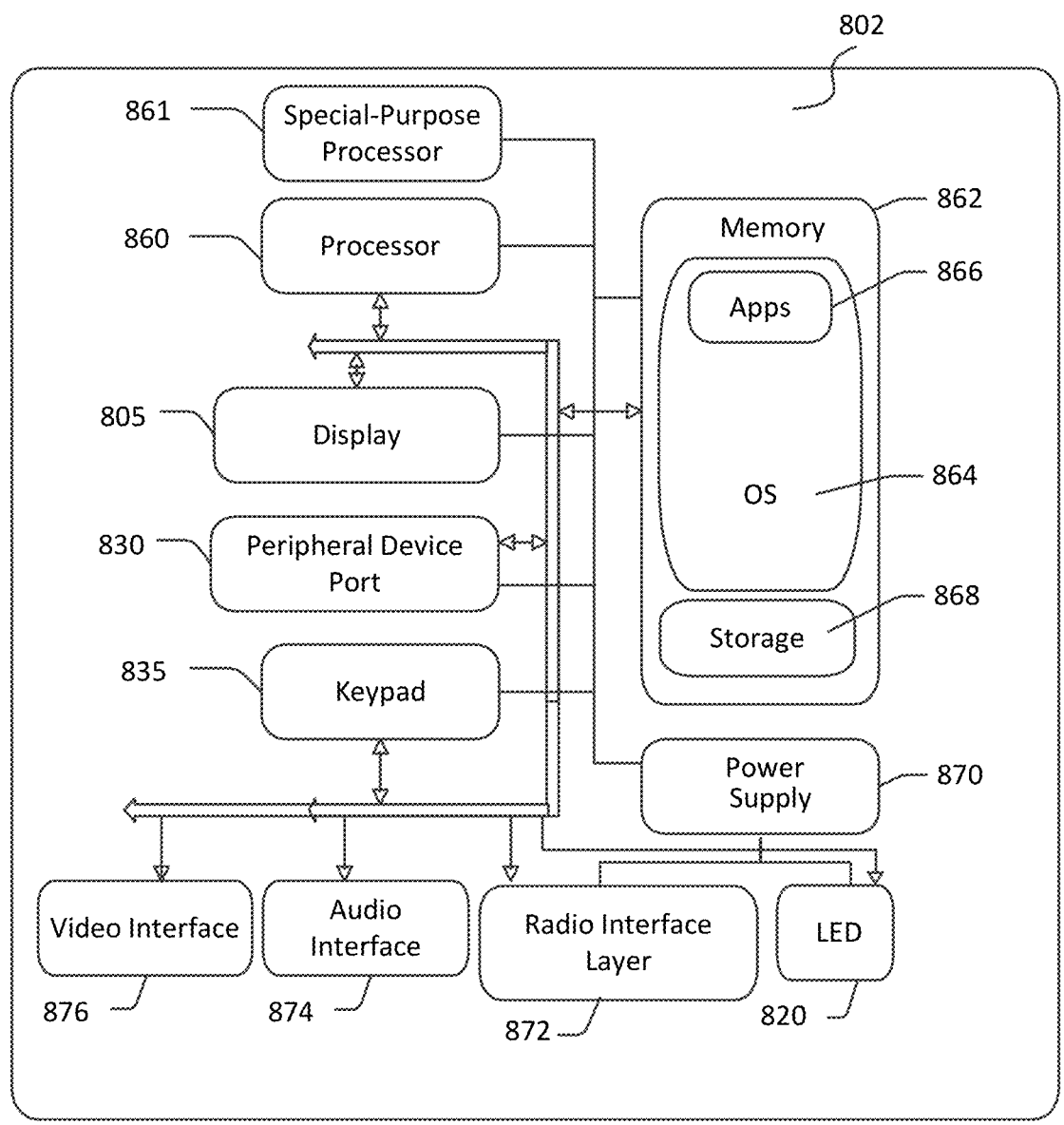

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements.

The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, email, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions for providing productivity insights regarding a user network as described herein (e.g., an event data monitor, index/store component, data aggregator, snapshot calculator, compare component and/or UX component, etc.).

The system 802 has a power supply 870, which may be implemented as one or more batteries. The power supply 870 may further include an external power source, such as an AC adapter or a powered docking cradle that supplements or recharges the batteries. The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 825 (e.g., audio transducer 825 illustrated in FIG. 8A). In the illustrated embodiment, the visual indicator 820 is a light emitting diode (LED) and the audio transducer 825 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 8A and 8B are described for purposes of illustrating the present methods and systems and are not intended to limit the disclosure to a particular sequence of steps or a particular combination of hardware or software components.

Figure 9:
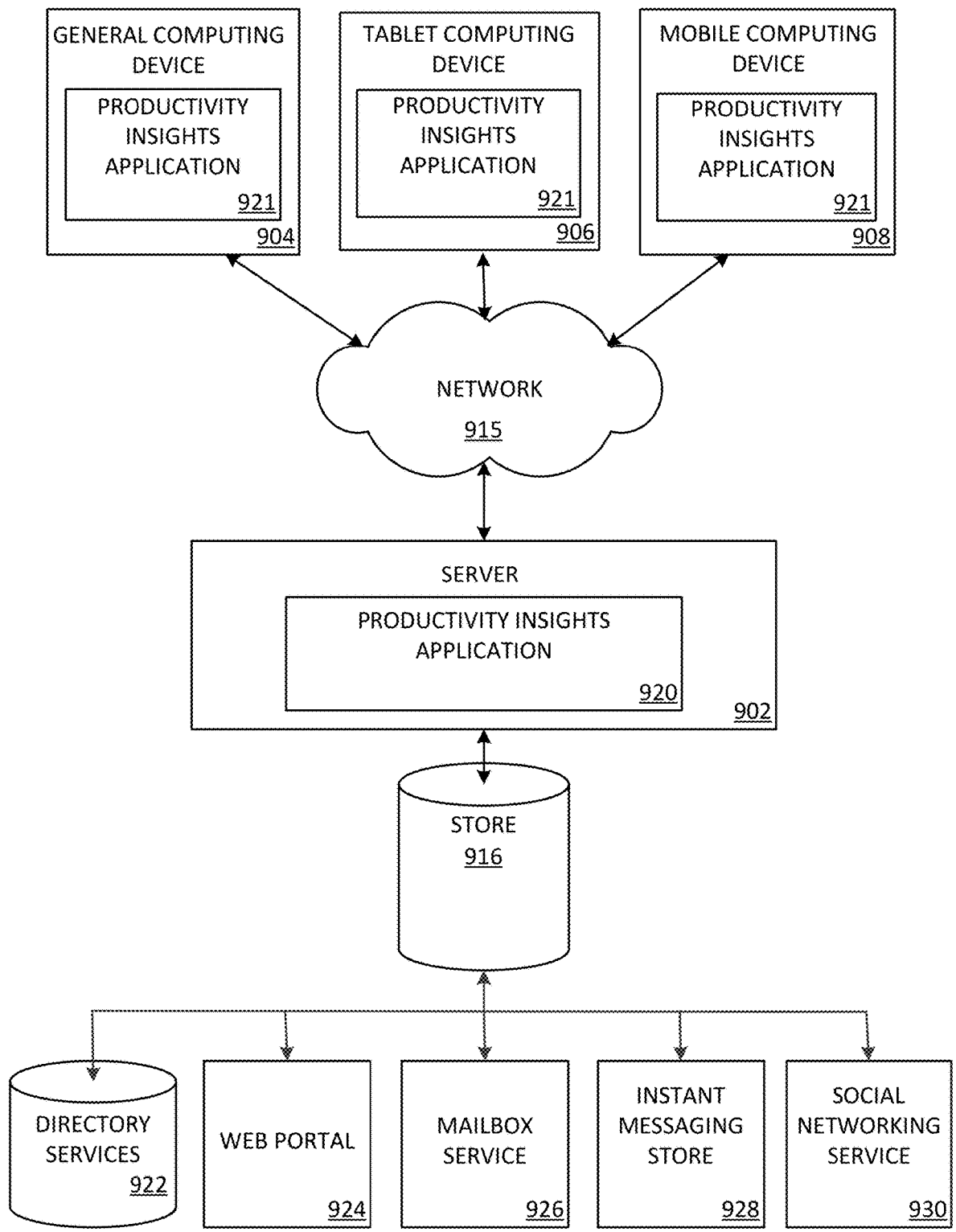
FIG. 9 is a simplified block diagram of a distributed computing system in which aspects of the present disclosure may be practiced.

FIG. 9 illustrates one aspect of the architecture of a system for processing data received at a computing system from a remote source, such as a general computing device 904 (e.g., personal computer), tablet computing device 906, or mobile computing device 908, as described above. Content displayed at server device 902 may be stored in different communication channels or other storage types. For example, various event data may be stored using a directory service 922, a web portal 924, a mailbox service 926, an instant messaging store 928, or a social networking service 930. The productivity insights application 921 may be employed by a client that communicates with server device 902, and/or the productivity insights application 920 may be employed by server device 902. The server device 902 may provide data to and from a client computing device such as a general computing device 904, a tablet computing device 906 and/or a mobile computing device 908 (e.g., a smart phone) through a network 915. By way of example, the computer system described above with respect to FIGS. 1-8 may be embodied in a general computing device 904 (e.g., personal computer), a tablet computing device 906 and/or a mobile computing device 908 (e.g., a smart phone). Any of these embodiments of the computing devices may obtain content from the store 916, in addition to receiving graphical data useable to either be pre-processed at a graphic-originating system or post-processed at a receiving computing system.

As should be appreciated, FIG. 9 is described for purposes of illustrating the present methods and systems and is not intended to limit the disclosure to a particular sequence of steps or a particular combination of hardware or software components.

Figure 10:
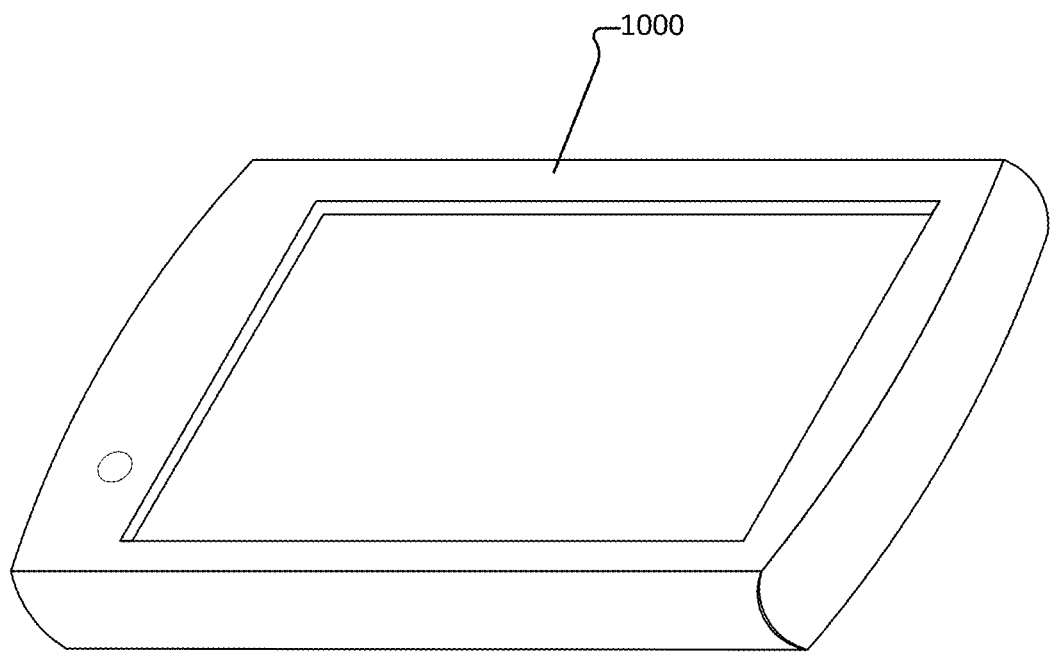
FIG. 10 illustrates a tablet computing device for executing one or more aspects of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 10 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer system comprising:
at least one processing unit; and
at least one memory storing computer executable instructions that, when executed by the at least one processing unit, cause the computer system to perform a method, the method comprising:
collecting and storing event data associated with a user network for each of a plurality of overlapping windows of time;
receiving a request including at least one parameter and a period of time, wherein the period of time corresponds to one or more of the overlapping windows of time;
sampling the stored event data to generate a continuous historical view over the period of time;
calculating a historical snapshot of the user network over the period of time based at least in part on the at least one parameter;
collecting event data for a current window of time;
calculating a current snapshot of the user network over the current window of time based at least in part on the at least one parameter;
determining a delta between the historical snapshot of the user network and the current snapshot of the user network for the at least one parameter, wherein the delta represents a change in productivity for the at least one parameter; and
quantifying the delta for the at least one parameter and causing the quantified delta to be displayed.

2. The computer system of claim 1, wherein event data comprises one or more of:
email send events;
email receive events;
email forward events;
email read events;
email reply events;
email dwell time; or
email reply-all events.

3. The computer system of claim 1, wherein event data comprises one or more of:
meeting invitation send events;
meeting invitation receive events;
meeting invitation accept events;
meeting invitation tentative events;

meeting invitation decline events;
attendees of a meeting event;
duration of a meeting event; or
organizer of a meeting event.

4. The computer system of claim 1, wherein a window of time comprises one of:
one minute;
one hour;
one week;
two weeks;
one month;
six months; or
one year.

5. The computer system of claim 1, further comprising:
aggregating the stored event data for at least a subset of the plurality of overlapping windows of time.

6. The computer system of claim 1, further comprising:
providing a notification regarding the delta between the historical snapshot of the user network and the current snapshot of the user network.

7. The computer system of claim 1, further comprising:
presenting the delta between the historical snapshot of the user network and the current snapshot of the user network in a dashboard.

8. The computer system of claim 1, further comprising:
making a recommendation based at least in part on the delta between the historical snapshot of the user network and the current snapshot of the user network in a dashboard.

9. The computer system of claim 1, wherein the at least one parameter is a number of email send events and email receive events between a user and a particular collaborator, and wherein the delta comprises one of:
a decrease in the number of email send events and email receive events between the user and the particular collaborator; or
an increase in the number of email send events and email receive events between the user and the particular collaborator.

10. The computer system of claim 9, wherein the delta is a decrease in the number of email send events and email receive events between the user and the particular collaborator, further comprising:
providing a losing touch notification regarding the particular collaborator.

11. The computer system of claim 9, wherein the delta is an increase in the number of email send events and email receive events between the user and the particular collaborator, further comprising:
providing a top collaborator notification regarding the particular collaborator.

12. The computer system of claim 1, further comprising one or more of:
calculating collaboration statistics over the period of time based at least in part on the at least one parameter; or
collecting derived statistics for a current window of time.

13. A method for providing productivity insights regarding a user network, the method performed by a computing device, the method comprising:
collecting and storing event data associated with the user network for each of a plurality of consecutive windows of time;
receiving a request including at least one parameter and a period of time;
calculating a historical snapshot of the user network over the period of time based at least in part on the at least one parameter;
collecting event data for a current window of time;
calculating a current snapshot of the user network over the current window of time based at least in part on the at least one parameter;
determining a delta between the historical snapshot of the user network and the current snapshot of the user network for the at least one parameter, wherein the delta represents a change in productivity for the at least one parameter; and
causing the delta to be displayed.

14. The method of claim 13, further comprising:
aggregating the stored event data for at least a subset of the plurality of consecutive windows of time.

15. The method of claim 13, further comprising:
providing the current snapshot in a dashboard.

16. The method of claim 13, wherein the current snapshot includes one or more top collaborators.

17. The method of claim 16, wherein the current snapshot includes one or more productivity insights regarding the top collaborators, comprising one or more of:
a total collaboration time;
an email read rate;
a response time; or
a read percentage.

18. The method of claim 13, wherein the current snapshot includes one or more productivity insights regarding collaboration with a manager, including one or more of:
a total collaboration time;
a one-on-one meeting time;
an email read rate;
a user response time; or
a manager response time.

19. The method of claim 16, further comprising providing a popup window for a selected top collaborator, the popup window comprising one or more of:
a number of unread emails received from the selected top collaborator;
a link to review unread email from the selected top collaborator;
a response time with respect to the selected top collaborator;
an overall response time with respect to all collaborators; or
a very important person (VIP) control.

20. A computer-readable storage medium storing computer executable instructions that, when executed by at least one processing unit, cause a computing device to:
collect and store event data associated with a user network for each of a plurality of overlapping windows of time;
receive a request including at least one parameter and a period of time, wherein the period of time corresponds to one or more of the overlapping windows of time;
calculate a historical snapshot of the user network over the plurality of overlapping windows of time based at least in part on the at least one parameter;
collect event data for the period of time in real time;
calculate a current snapshot of the user network over the period of time based at least in part on the at least one parameter;
determine a delta between the historical snapshot of the user network and the current snapshot of the user network for the at least one parameter, wherein the delta represents a change in productivity for the at least one parameter; and quantify the delta for the at least one parameter and cause the quantified delta to be displayed.

* * * * *